P. HERVIER.
Brick-Machines.
No. 154,044. Patented Aug. 11, 1874.
Fig. I
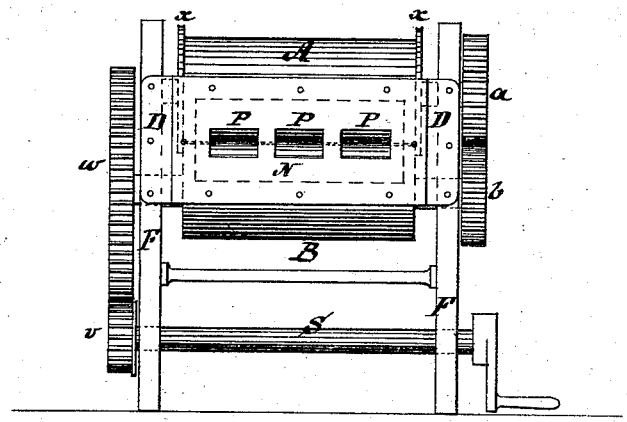
Fig. II
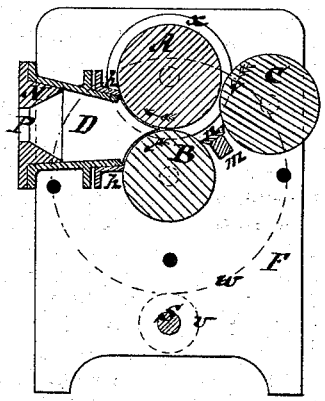
Witnesses.
Inventor.
Pierre Hervier
per Henry E. Roeder
Attorney.

UNITED STATES PATENT OFFICE.

PIERRE HERVIER, OF NEW YORK, N. Y., ASSIGNOR TO HENRY MAWRER, OF SAME PLACE.

IMPROVEMENT IN BRICK-MACHINES.

Specification forming part of Letters Patent No. 154,044, dated August 11, 1874; application filed June 1, 1874.

*To all whom it may concern:*

Be it known that I, PIERRE HERVIER, of New York, in the State of New York, have invented a new and Improved Brick-Machine, of which the following is a specification:

The nature of my invention consists in the arrangement of suitable rollers for the thorough working and tempering of the clay, in combination with a receiving-chamber provided with suitable openings, through which the crushed clay is forced in a continuous stream, to be hereafter separated or cut into the required size of a brick or other article.

In the accompanying drawing, Figure I represents a front view of my improved machine, and Fig. II is a cross-section of the same.

A, B, and C are three rollers, connected together by suitable wheels, $a$, $b$, and $c$, (the latter, $c$, is not shown in the drawing,) which receive their motion from the gear-wheel $w$, attached to the shaft of the roller B, and operated through the pinion $v$, fast on the driving-shaft S. The roller A is provided with side flanges $x$, against which the sides of the rollers B and C are made to work, to prevent the material working out on the sides. The rollers A and C turn in movable bearings in the frames F F, to allow the distance between each other and between the rollers A and B to be regulated. Between the rollers B and C a scraper, $n$, is arranged, capable of being regulated so as to scrape the surfaces of both rollers, and at the same time act as a guide to conduct the material ground between the rollers A and C between the rollers A and B. To the front of the rollers A and B a receiving-box, D, is attached, with its sides projecting between and fitting against the surfaces of the rollers A and B. Upon the top and bottom of this box D scrapers $h\ h$ are fastened, bearing against the surfaces of the rollers A and B, and arranged in such a manner as to be moved and regulated to bear tight against the same, to clean the same of any clay or material which may adhere, and throw the same into the box D. Against the front of this box D a frame, N, is attached, provided with suitable openings, P, corresponding to the style and shape of the article to be made.

The clay or brick-earth is first well mixed, and is then introduced between the rollers A and C through a suitable hopper, and then again between the rollers A and B, where it is thoroughly ground and worked fine, and is then forced into the box D and through the openings P, and delivered in an unbroken stream, to be cut up into bricks or tiles by suitable knives or wires.

By hanging suitable mandrels or cores in the box D, hollow or perforated bricks or tubes may be made.

I do not claim an arrangement of rollers for crushing the clay by themselves; but

What I claim as my invention, and desire to secure by Letters Patent, is—

The combination of the rollers A B C with a receiving-box, D, provided with movable scrapers $n$ and a mold-frame, N, having openings P in its surface, the whole being constructed substantially in the manner and for the purpose hereinbefore set forth.

PIERRE HERVIER.

Witnesses:
HENRY E. ROEDER,
JAMES P. HYDE.